(12) United States Patent
Nguyen et al.

(10) Patent No.: US 11,745,611 B1
(45) Date of Patent: Sep. 5, 2023

(54) SYSTEM AND METHOD FOR CONTROL OF A MULTI-FUNCTION ELECTRIC POWERTRAIN

(71) Applicant: GM GLOBAL TECHNOLOGY OPERATIONS LLC, Detroit, MI (US)

(72) Inventors: Minh-Khai Nguyen, Troy, MI (US); Rashmi Prasad, Troy, MI (US); Chandra S. Namuduri, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/975,791

(22) Filed: Oct. 28, 2022

(51) Int. Cl.
*B60L 50/52* (2019.01)
*B60L 53/24* (2019.01)
*B60L 50/51* (2019.01)

(52) U.S. Cl.
CPC .............. *B60L 53/24* (2019.02); *B60L 50/51* (2019.02); *B60L 2210/40* (2013.01)

(58) Field of Classification Search
CPC ................................. B60L 53/24; B60L 50/51
See application file for complete search history.

(56) References Cited

U.S. PATENT DOCUMENTS

| | | | | |
|---|---|---|---|---|
| 2013/0002262 A1* | 1/2013 | Tago | ..................... | B60L 3/0069 324/503 |
| 2013/0249469 A1* | 9/2013 | Pahlevaninezhad | ...... | H02J 7/02 320/137 |
| 2014/0062349 A1* | 3/2014 | Isayeva | ................... | G05B 9/02 318/139 |
| 2021/0044135 A1* | 2/2021 | Lee | ........................ | H02J 7/1492 |
| 2021/0316623 A1* | 10/2021 | Lehn | ....................... | H02P 27/08 |
| 2022/0255487 A1* | 8/2022 | Wolf | ....................... | B60L 15/08 |
| 2023/0038790 A1* | 2/2023 | Ling | ...................... | B60L 58/27 |
| 2023/0158897 A1* | 5/2023 | Linn | .................... | B60L 3/0084 701/22 |

* cited by examiner

*Primary Examiner* — Jared Fureman
*Assistant Examiner* — Esayas G Yeshaw
(74) *Attorney, Agent, or Firm* — Quinn IP Law

(57) ABSTRACT

A system for control of an electric powertrain is provided. The powertrain includes a battery configured for providing electrical energy at a first relatively higher voltage in direct current. The powertrain further includes a power inverter including a first phase circuit, a second phase circuit including first and second switches, and a third phase circuit including third and fourth switches. The powertrain further includes a motor configured for receiving alternating current electrical energy from the power inverter. The system further includes a computerized controller operating a charging cycle. The charging cycle includes deactivating the first phase circuit of the power inverter and selectively cyclically activating the first switch, the second switch, the third switch, and the fourth switch to direct electrical energy provided at a second relatively lower voltage in direct current through the motor to provide a flow of electrical energy at the first voltage to the battery.

19 Claims, 3 Drawing Sheets

SYSTEM AND METHOD FOR CONTROL OF A MULTI-FUNCTION ELECTRIC POWERTRAIN

INTRODUCTION

The disclosure generally relates to a system and method for control of a multi-function electric powertrain.

An electric drive or e-drive is a powertrain that utilizes electrical energy to provide power to an electric machine. The electric machine transforms the electric energy into an output torque upon an output shaft. The electric machine may additionally receive an input torque and provide electrical energy. Electrical energy may be stored within a battery.

Electrical energy may be provided as direct current (DC) or alternating current (AC). A power inverter may be utilized to transform electrical energy from AC to DC or from DC to AC.

SUMMARY

A system for control of a multi-function electric powertrain is provided. The system includes the electric powertrain. The powertrain includes a battery configured for providing electrical energy at a first relatively higher voltage in direct current and a three-phase power inverter. The power inverter includes a first phase circuit of the three-phase power inverter, a second phase circuit of the three-phase power inverter including a first switch and a second switch, and a third phase circuit of the three-phase power inverter including a third switch and a fourth switch. The powertrain further includes a three-phase, four-terminal electric machine configured for receiving alternating current electrical energy from the three-phase power inverter and configured for providing an output torque to an output shaft. The system further includes a computerized charging controller configured for operating a charging cycle. The charging cycle includes deactivating the first phase circuit of the three-phase power inverter and selectively cyclically activating the first switch, the second switch, the third switch, and the fourth switch to direct electrical energy provided at a second relatively lower voltage in direct current through the three-phase, four-terminal electric machine to provide a flow of electrical energy at the first relatively higher voltage in direct current to the battery.

In some embodiments, selectively cyclically activating the first switch, the second switch, the third switch, and the fourth switch includes, in a first pattern, activating the first switch and the fourth switch and deactivating the second switch and the third switch and, in a second pattern, activating the second switch and the third switch and deactivating the first switch and the fourth switch.

In some embodiments, the battery configured for providing the electrical energy at 800 Volts in direct current.

In some embodiments, the electrical energy provided at the second relatively lower voltage includes electrical energy at 400 Volts in direct current.

In some embodiments, the system further includes a charging unit providing electrical energy at the second relatively lower voltage in direct current.

In some embodiments, the first switch, the second switch, the third switch, and the fourth switch are insulated-gate bipolar transistors.

In some embodiments, the first switch, the second switch, the third switch, and the fourth switch are silicon carbide metal-oxide-semiconductor field-effect transistors.

According to one alternative embodiment, a system for control of a multi-function electric powertrain is provided. The system includes a charging unit providing electrical energy at a first relatively lower voltage in direct current and a device. The device includes the electric powertrain. The electric powertrain includes a battery configured for providing electrical energy at a second relatively higher voltage in direct current and a three-phase power inverter. The power inverter includes a first phase circuit of the three-phase power inverter, a second phase circuit of the three-phase power inverter including a first switch and a second switch, and a third phase circuit of the three-phase power inverter including a third switch and a fourth switch. The powertrain further includes a three-phase, four-terminal electric machine configured for receiving alternating current electrical energy from the three-phase power inverter and configured for providing an output torque to an output shaft. The device further includes a computerized charging controller configured for operating a charging cycle. The charging cycle includes deactivating the first phase circuit of the three-phase power inverter and selectively cyclically activating the first switch, the second switch, the third switch, and the fourth switch to direct the electrical energy provided from the charging unit through the three-phase, four-terminal electric machine to provide a flow of electrical energy at the second relatively higher voltage in direct current to the battery.

In some embodiments, the device is a vehicle.

In some embodiments, selectively cyclically activating the first switch, the second switch, the third switch, and the fourth switch includes, in a first pattern, activating the first switch and the fourth switch and deactivating the second switch and the third switch and, in a second pattern, activating the second switch and the third switch and deactivating the first switch and the fourth switch.

In some embodiments, the battery configured for providing the electrical energy at 800 Volts in direct current.

In some embodiments, the electrical energy provided at the second relatively lower voltage includes electrical energy at 400 Volts in direct current.

In some embodiments, the first switch, the second switch, the third switch, and the fourth switch are insulated-gate bipolar transistors.

In some embodiments, the first switch, the second switch, the third switch, and the fourth switch are silicon carbide metal-oxide-semiconductor field-effect transistors.

According to one alternative embodiment, a method for control of a multi-function electric powertrain is provided. The method includes connecting the electric powertrain to a charging unit configured for providing electrical energy at a first relatively lower voltage in direct current. The method further includes operating a three-phase power inverter of the electric powertrain to direct the electrical energy at the first relatively lower voltage in direct current through a three-phase, four terminal electric machine of the electric powertrain in order to create a flow of electrical energy at a second relatively higher voltage in direct current to charge a battery of the electric powertrain. Operating the three-phase power inverter includes deactivating a first phase circuit of the three-phase power inverter and selectively cyclically activating a first switch of a second phase circuit of the three-phase power inverter, a second switch of the second phase circuit of the three-phase power inverter, a third switch of a third phase circuit of the three-phase power inverter, and a fourth switch of the third phase circuit of the three-phase power inverter.

In some embodiments, the electrical energy at the first relatively lower voltage in direct current includes electrical energy at 400 Volts in direct current.

In some embodiments, the electrical energy at the second relatively higher voltage in direct current includes electrical energy at 800 Volts in direct current.

In some embodiments, the first switch, the second switch, the third switch, and the fourth switch are insulated-gate bipolar transistors.

In some embodiments, the first switch, the second switch, the third switch, and the fourth switch are silicon carbide metal-oxide-semiconductor field-effect transistors.

The above features and advantages and other features and advantages of the present disclosure are readily apparent from the following detailed description of the best modes for carrying out the disclosure when taken in connection with the accompanying drawings.

DETAILED DESCRIPTION

Figure 1:
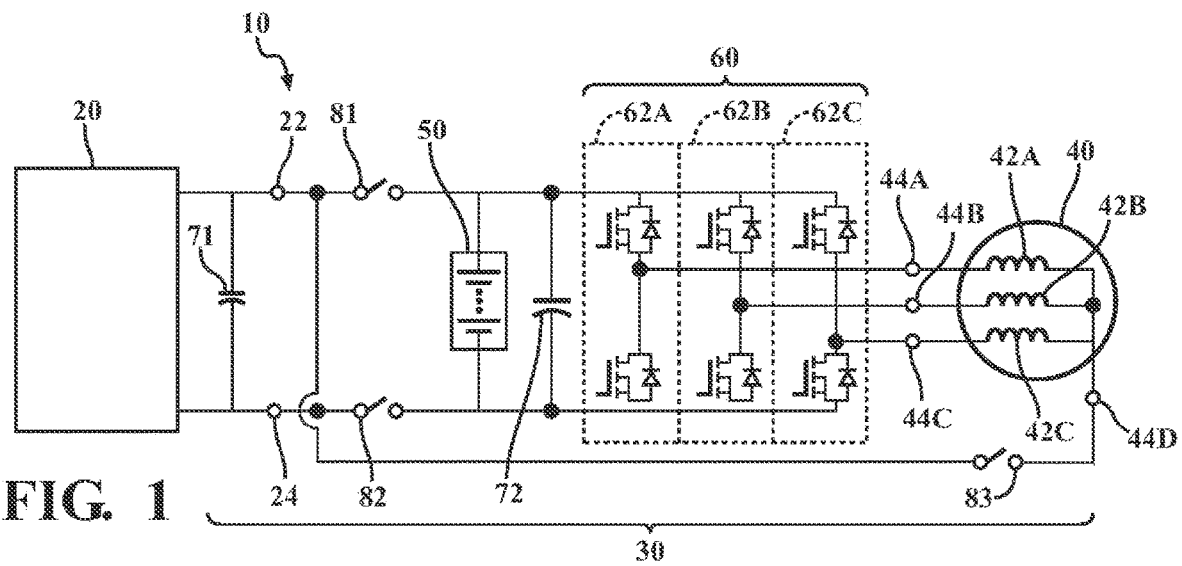
FIG. 1 schematically illustrates an exemplary system configured for recharging a relatively high voltage battery with a relatively low voltage charging unit power supply, in accordance with the present disclosure.

An electric powertrain may include a battery, a power inverter, and an electric machine configured to provide an output torque to an output shaft. An electric powertrain may be utilized within a vehicle, a boat, an airplane, a power generation system, or other similar systems. An electric powertrain operates and depletes energy from the battery or a state of charge of the battery is depleted. The battery may be rechargeable, where a voltage is applied to the battery and a state of charge of the battery is replenished.

A battery includes a nominal operating voltage. The nominal operating voltage may describe an open circuit terminal voltage for the battery at a maximum state of charge. As the battery is depleted, the open circuit terminal voltage decreases as the state of charge decreases. A rechargeable battery may be recharged by applying a voltage to the terminals of the battery in excess of the open circuit terminal voltage. For example, if a battery has a nominal operating voltage of 800 Volts, as the battery is discharged and the open circuit terminal voltage of the battery decreases below 800 Volts, the battery may be recharged by applying electrical energy at a voltage of at least 800 Volts to the battery terminals.

Different systems may have different operating parameters. Some recharging systems operate at a 400 Volt nominal operating voltage. If electrical energy is applied to the terminals of an 800 Volt battery at 400 Volts, the battery will not charge. One may utilize a DC-DC converter to step up or change the voltage of a charger power supply from 400 Volts to 800 Volts. A DC-DC converter is expensive and includes significant weight. Electric vehicles utilizing an electric powertrain may be sensitive to weight. Electric vehicles include excellent efficiency when weight of the vehicles is reduced or kept at a relatively low weight. A DC-DC converter additionally includes a package size which takes up space within a vehicle or other system. Including a DC-DC converter within an electric vehicle may be expensive and inefficient.

An electric machine may be an AC electric machine. The electric machine may include three-phases. The electric machine may include four terminals, one terminal for each phase and a ground terminal. An electric machine may include windings within the electric machine configured for transforming electrical energy into mechanical energy during operation where the battery is discharged to provide electrical energy to the electric machine. The windings may additionally transform electrical energy from one voltage to a second voltage.

A system and method for control of a multi-function electric powertrain is provided. The disclosed system and method provide backward compatibility of an 800 Volt electric powertrain with a 400 Volt charging system without using a dedicated direct current-to-direct current (DC-DC) converter by using a four terminal electric machine and an associated power inverter as a boost converter. The system and method utilize two-phase interleaved pulse-width-modulation (PWM) control with an electric machine rotor d-axis closely aligned with the axis of the inactive machine phase to maximize efficiency.

The power inverter includes three-phase legs, one for each phase of AC electrical power that is created by the power inverter under operation where the battery is discharged to supply electrical energy to the electric machine. In the disclosed system and method, a first inverter phase leg of the three inverter phase legs is shielded or disabled. The disclosed system provides excellent performance, including small input current ripple, interleaved two-phase operation, and low torque ripple. The disclosed system and method provide further advantages including using a relatively small number of switches for rotor position tolerance, low motor conduction loss, and the benefits of system operation at 800 Volts as compared to operation at 400 Volts.

The disclosed system accomplishes DC fast charging for an electric powertrain relatively higher voltage vehicle from lower voltage charging systems or vehicle without using a dedicated DC-DC converter using a four-terminal electric machine and inverter as a boost converter. The disclosed system selectively connects the neutral terminal of the electric machine to terminals of a DC fast charge unit if the charger voltage is significantly lower than that of the vehicle propulsion battery. The disclosed system energizes low side switches in two out of three-phases of the associated power inverter via the electric machine phase windings to act as interleaved boost converter in conjunction with the electric machine phase windings.

Two of the three-phases are cyclically energized during a charging operation. The two active phases are chosen such that the rotor d-axis position of the motor is closest to the axis of the inactive phase. The switching frequency and PWM duty cycle of the active switches are chosen to provide excellent efficiency and a desired voltage boost ratio, respectively.

The same concept may be used to achieve buck converter function by PWM control of upper switches in the active phase legs for vehicle-to-vehicle DC fast charging of 800 Volts to 400 Volts.

Referring now to the drawings, wherein like reference numbers refer to like features throughout the several views, FIG. 1 schematically illustrates an exemplary system 10 configured for recharging a relatively high voltage battery 50 with a relatively low voltage charging unit power supply 20. An electric powertrain 30 is illustrated including the battery 50, a three-phase power inverter 60, and a three-phase, four-terminal electric machine 40. The electric powertrain 30 includes selectively activated switches 81, 82, 83 useful to control operation of the electric powertrain 30. The electric powertrain 30 includes capacitor 72 useful to condition or filter a voltage of electrical energy within the electric powertrain 30. A capacitor 71 useful to condition or filter a voltage of electrical energy provided by the relatively low voltage charging unit power supply 20 is additionally provided. The relatively low voltage charging unit power supply 20 is connected to the electric powertrain 30 through terminals 22, 24.

The electric powertrain 30 may operate in a first mode, wherein electrical energy is supplied by the battery 50 as DC electrical energy. The three-phase power inverter 60 includes three-phase circuits 62A, 62B, 62C. Each of the phase circuits 62A, 62B, 62C include circuitry configured to transform DC electrical energy, supplied at a nearly constant voltage, to AC electrical energy in a waveform similar to a sine wave. The three-phase circuits 62A, 62B, 62C collectively provide three-phase AC electrical power to the electric machine 40, which, in the first mode, transforms the electrical energy provided by the power inverter into mechanical energy in the form of an output torque to an output shaft. Over a period of operation, a state of charge of the battery is depleted during operation of the electric powertrain 30 in the first mode.

The electric machine includes four terminals 44A, 44B, 44C, 44D, with terminals 44A, 44B, 44C each electrically connected to one of the three-phase circuits 62A, 62B, 62C. The fourth terminal 44D is a ground terminal. Each of the terminals 44A, 44B, 44C is connected to a respective phase circuit 42A, 42B, 42C within the electric machine 40. The phase circuits 42A, 42B, 42C each include a plurality of stator windings which act upon rotor windings upon an electric machine rotor and cause an output torque upon the rotor during operation of the electric powertrain 30 in the first mode.

The electric powertrain 30 may operate in a second mode, wherein a relatively high voltage charging unit may be connected to the electric powertrain 30 and utilized to charge the battery 50. Wherein the battery is configured to operate at a nominal operating voltage of 800 Volts, an 800 Volt charging unit may be attached to the powertrain and utilized to charge the battery 50. Operating in the second mode, the electrical energy supplied by the exemplary 800 Volt charging unit is provided at a high enough voltage to charge the battery 50 without a DC-DC converter or a voltage boost.

As part of the system 10, the electric powertrain 30 may operate in a third mode, wherein electrical energy supplied at a relatively lower voltage by the relatively low voltage charging unit power supply 20 may be transformed or boosted to a higher voltage and utilized to charge the battery 50. During operation in the third mode, the switch 82 and the switch 83 are each operated in a closed state, enabling current flow therethrough, and the switch 81 is operated in an open state, disabling current flow therethrough. A first phase circuit 62A of the power inverter 60 is disabled or shielded, such that no current flows through the first phase circuit 62A. The electrical energy from the relatively low voltage charging unit power supply 20 flows through the second phase circuit 62B and the associated phase circuit 42B of the electric machine. The electrical energy from the relatively low voltage charging unit power supply 20 additionally flows through the third phase circuit 62C and the associated phase circuit 42C of the electric machine. The windings of the electric machine 40 boost the voltage of the electrical energy from an exemplary 400 Volts AC to an exemplary 800 Volts AC. The circuitry of the phase circuits 62B, 62C alternatively cycle to provide electrical energy at a nearly steady voltage approximating 800 Volts DC, which may be applied to terminals of the battery 50 for charging.

Figure 2:
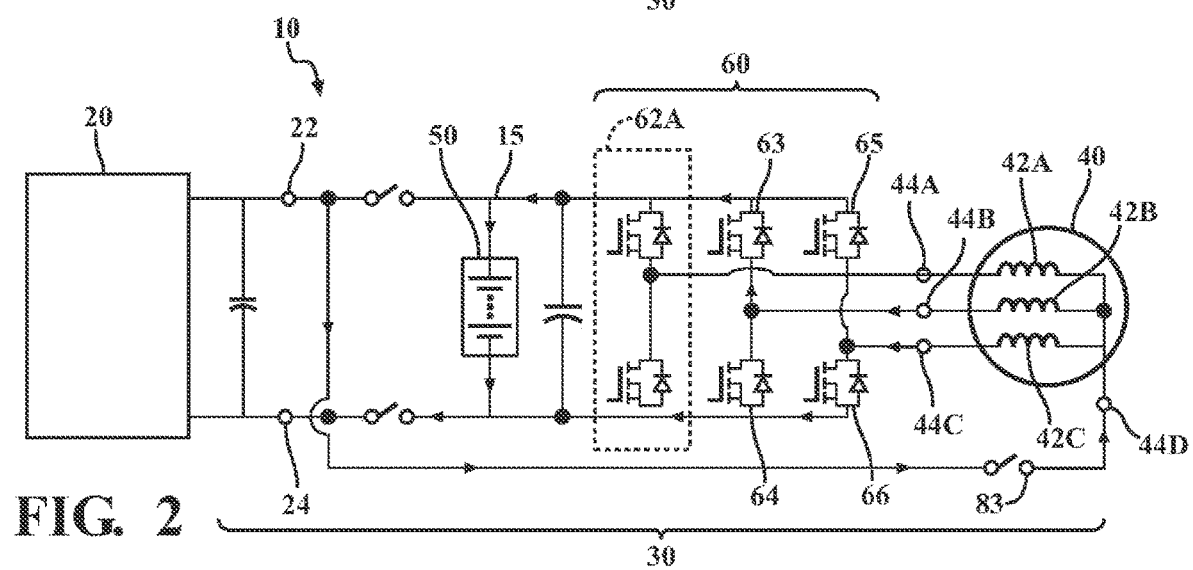
FIG. 2 schematically illustrates the system of FIG. 1 including two switches of the second phase circuit of the power inverter and two additional switches of the third phase circuit of the power inverter selectively cyclically operating to provide electrical energy at a boosted voltage to the battery, wherein the switches activated in a first pattern, in accordance with the present disclosure.
Figure 3:
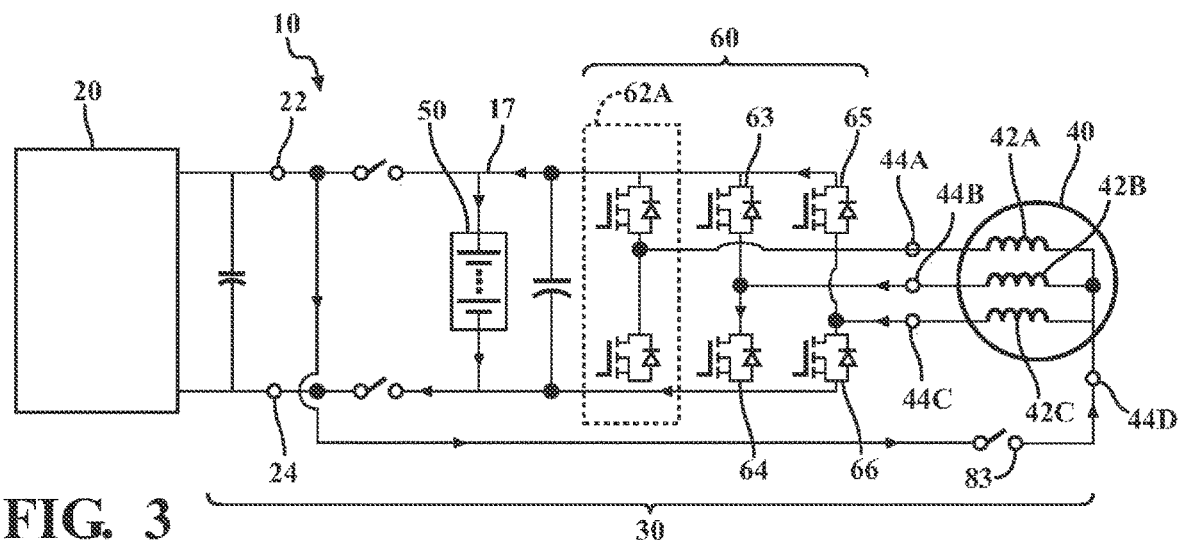
FIG. 3 schematically illustrates the system of FIG. 2, wherein the switches are activated in a second pattern, in accordance with the present disclosure.

FIGS. 2 and 3 illustrate the system 10 of FIG. 1 including switches 63, 64 of the second phase circuit 62B of the power inverter 60 and switches 65, 66 of the third phase circuit 62C of the power inverter 60 alternatively cycling to provide electrical energy at a boosted voltage to the battery 50. The switches 63, 64, 65, 66 may each include an insulated-gate bipolar transistor (IGBT), a silicon carbide (SiC) metal-oxide-semiconductor field-effect transistor (MOSFET), or a similar electronic switch. The switches 63, 64, 65, 66 may be described as a first switch, a second switch, a third switch, and a fourth switch, respectively. FIGS. 2 and 3 illustrate operation of the electric powertrain 30 in the third mode. The electric powertrain 30 is illustrated including the battery 50, the power inverter 60, and the electric machine 40. The relatively low voltage charging unit power supply 20 is connected to the electric powertrain 30 through terminals 22, 24. The first phase circuit 62A of the power inverter 60 is maintained in a disabled state during operation of the third mode. The switches 63, 64, 65, 66 enable electrical signal control of whether current is permitted through a circuit. The switches 63, 64, 65, 66 may include diodes enabling current flow in one direction through the switches 63, 64, 65, 66 and preventing flow in the opposite direction. The electric machine 40 includes terminals 44A, 44B, 44C connecting the phase circuits 62A, 62B, 62C of the power inverter 60 of FIG. 1 to the phase circuits 42A, 42B, 42C of the electric machine 40, respectively. The electric machine 40 further includes the terminal 44D connecting the phase circuits 42A, 42B, 42C to ground.

The switches 63, 64, 65, 66 may be activated in an alternating pattern to provide DC electrical energy to the battery 50 by converting AC electrical energy provided by the electric machine 40. In FIG. 2, the switches 63, 64, 65, 66 are illustrated activated in a first pattern 15, with the switches 63 and 66 activated to permit current flow therethrough. Arrows are superimposed over circuit lines to show flow of current through the system 10. Current flows through switch 63 and subsequently through the battery 50 to charge the battery 50. The windings of the phase circuit 42B step up or boost the electrical energy provided by the relatively low voltage charging unit power supply 20 from 400 Volts to 800 Volts for charging the battery 50.

In FIG. 3, the switches 63, 64, 65, 66 are illustrated activated in a second pattern 17, with the switches 64 and 65 activated to permit current flow therethrough. Arrows are superimposed over circuit lines to show flow of current through the system 10. Current flows through switch 65 and subsequently through the battery 50 to charge the battery 50. The windings of the phase circuit 42C step up or boost the electrical energy provided by the relatively low voltage charging unit power supply 20 from 400 Volts to 800 Volts for charging the battery 50.

Figure 4:
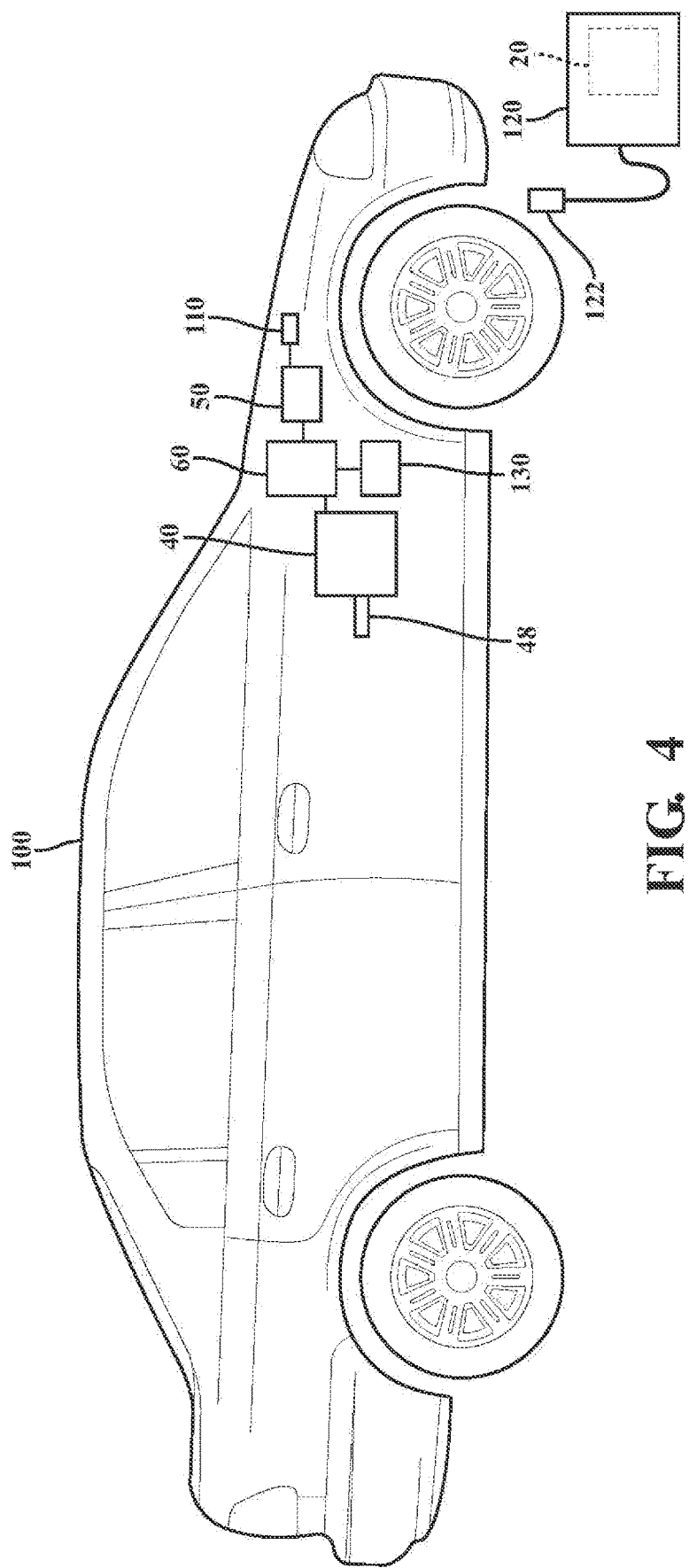
FIG. 4 schematically illustrates an exemplary device and a fast-charging unit configured for charging the battery of the device, in accordance with the present disclosure.

FIG. 4 schematically illustrates an exemplary device 100 and a fast-charging unit 120 configured for charging the battery 50 of the device 100. The device 100 may be a vehicle. The device 100 includes the system 10 of FIG. 1 including the battery 50, the power inverter 60, and the electric machine 40. The electric machine 40 includes an output shaft 48 configured for providing a motive force to the device 100. A charging port 110 of the device 100 is illustrated. A computerized charging controller 130 is illustrated. The fast-charging unit 120 includes the relatively low voltage charging unit power supply 20 of FIG. 1. The fast-charging unit 120 includes a charging connector 122 connected to the relatively low voltage charging unit power supply 20 with a tether. The charging connector 122 includes the terminals 22 and 24 of FIG. 1 and is configured for attachment to the charging port 110 of the device 100. In another embodiment, the device 100 may be a boat, an airplane, a power generation unit, or other similar configuration.

The computerized charging controller 130 is a computerized device which may include a processor, random-access memory (RAM), and a memory storage device. The computerized charging controller 130 may be a system on a chip (SoC). The computerized charging controller 130 may include programming including an operating system. The computerized charging controller 130 may further include programming configured for control of the system 10 or the powertrain 30 of FIG. 1 during a charging event. The computerizing charging controller 130 may include programming to determine whether the fast-charging unit 120 is supplying electrical energy at a relatively low voltage or at a relatively high voltage. The computerizing charging controller 130 may further include programming to control operation of the powertrain 30 including the power inverter 60 and the electric machine 40 to achieve the methods described herein.

Figure 5:
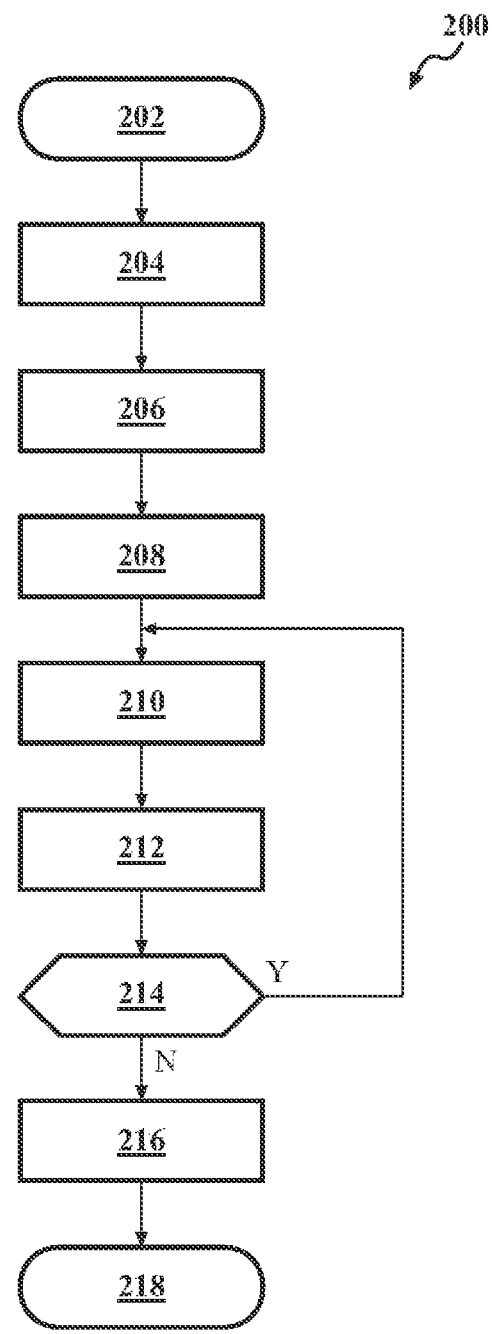
FIG. 5 is a flowchart illustrating a method for control of the electric powertrain of FIG. 1, in accordance with the present disclosure.

FIG. 5 is a flowchart illustrating a method 200 for control of the electric powertrain 30 of FIG. 1. The method 200 is described in relation to components of the system 10 of FIG. 1, and the method 200 may alternatively be utilized with other physical configurations. The method 200 starts at step 202. At step 204, the electric powertrain 30 is utilized to provide a useful function, wherein a state of charge of the battery 50 is depleted over a period of operation. At step 206, the electric powertrain 30 is connected to the relatively low voltage charging unit power supply 20 to enable recharging of the battery 50. At step 208, a first phase circuit 62A of a power inverter 60 of the electric powertrain 30 is disabled. At step 210, the switches 63, 66 of the power inverter 60 are activated and the switches 64, 65 of the power inverter 60 are deactivated to enable current to flow in the first pattern 15 of FIG. 2. At step 212, the switches 64, 65 of the power inverter 60 are activated and the switches 63, 66 of the power inverter 60 are deactivated to enable current to flow in the second pattern 17 of FIG. 3. At step 214, a determination is made whether the battery 50 is to continue charging. If the battery 50 is to continue charging, the method 200 returns to step 210 to continue alternating between the first pattern 15 and the second pattern 17. If the battery 50 is not to continue charging, the method 200 advances to the step 216, where the relatively low voltage charging unit power supply 20 is disconnected from the electric powertrain 30 to enable use of the electric powertrain 30 to provide the useful function. The method 200 ends at step 218. The method 200 may include additional and/or alternative method steps, and the disclosure is not intended to be limited to the examples provided herein.

While the best modes for carrying out the disclosure have been described in detail, those familiar with the art to which this disclosure relates will recognize various alternative designs and embodiments for practicing the disclosure within the scope of the appended claims.

What is claimed is:

1. A system for control of a multi-function electric powertrain, the system comprising:
  the electric powertrain, including:
    a battery configured for providing electrical energy at a first relatively higher voltage in direct current;
    a three-phase power inverter including:
      a first phase circuit of the three-phase power inverter;
      a second phase circuit of the three-phase power inverter including a first switch and a second switch;
      a third phase circuit of the three-phase power inverter including a third switch and a fourth switch; and
    a three-phase, four-terminal electric machine configured for receiving alternating current electrical energy from the three-phase power inverter and configured for providing an output torque to an output shaft; and
  a computerized charging controller configured for operating a charging cycle including:
    deactivating the first phase circuit of the three-phase power inverter; and
    selectively cyclically activating the first switch, the second switch, the third switch, and the fourth switch to direct electrical energy provided at a second relatively lower voltage in direct current through the three-phase, four-terminal electric machine to provide a flow of electrical energy at the first relatively higher voltage in direct current to the battery.

2. The system of claim 1, wherein selectively cyclically activating the first switch, the second switch, the third switch, and the fourth switch includes:
  in a first pattern, activating the first switch and the fourth switch and deactivating the second switch and the third switch; and
  in a second pattern, activating the second switch and the third switch and deactivating the first switch and the fourth switch.

3. The system of claim 1, wherein the battery configured for providing the electrical energy at 800 Volts in direct current.

4. The system of claim 3, wherein the electrical energy provided at the second relatively lower voltage includes electrical energy at 400 Volts in direct current.

5. The system of claim 1, further comprising a charging unit providing electrical energy at the second relatively lower voltage in direct current.

6. The system of claim 1, wherein the first switch, the second switch, the third switch, and the fourth switch are insulated-gate bipolar transistors.

7. The system of claim 1, wherein the first switch, the second switch, the third switch, and the fourth switch are silicon carbide metal-oxide-semiconductor field-effect transistors.

8. A system for control of a multi-function electric powertrain, the system comprising:
  a charging unit providing electrical energy at a first relatively lower voltage in direct current; and
  a device including:
    the electric powertrain including:

a battery configured for providing electrical energy at a second relatively higher voltage in direct current;
a three-phase power inverter including:
  a first phase circuit of the three-phase power inverter;
  a second phase circuit of the three-phase power inverter including a first switch and a second switch;
  a third phase circuit of the three-phase power inverter including a third switch and a fourth switch; and
a three-phase, four-terminal electric machine configured for receiving alternating current electrical energy from the three-phase power inverter and configured for providing an output torque to an output shaft; and
a computerized charging controller configured for operating a charging cycle including:
  deactivating the first phase circuit of the three-phase power inverter; and
  selectively cyclically activating the first switch, the second switch, the third switch, and the fourth switch to direct the electrical energy provided from the charging unit through the three-phase, four-terminal electric machine to provide a flow of electrical energy at the second relatively higher voltage in direct current to the battery.

9. The system of claim 8, wherein the device is a vehicle.

10. The system of claim 8, wherein selectively cyclically activating the first switch, the second switch, the third switch, and the fourth switch includes:
  in a first pattern, activating the first switch and the fourth switch and deactivating the second switch and the third switch; and
  in a second pattern, activating the second switch and the third switch and deactivating the first switch and the fourth switch.

11. The system of claim 8, wherein the battery is configured for providing the electrical energy at 800 Volts in direct current.

12. The system of claim 11, wherein the electrical energy provided at the first relatively lower voltage includes electrical energy at 400 Volts in direct current.

13. The system of claim 8, wherein the first switch, the second switch, the third switch, and the fourth switch are insulated-gate bipolar transistors.

14. The system of claim 8, wherein the first switch, the second switch, the third switch, and the fourth switch are silicon carbide metal-oxide-semiconductor field-effect transistors.

15. A method for control of a multi-function electric powertrain, the method comprising:
  connecting the electric powertrain to a charging unit configured for providing electrical energy at a first relatively lower voltage in direct current;
  operating a three-phase power inverter of the electric powertrain to direct the electrical energy at the first relatively lower voltage in direct current through a three-phase, four terminal electric machine of the electric powertrain in order to create a flow of electrical energy at a second relatively higher voltage in direct current to charge a battery of the electric powertrain, wherein operating the three-phase power inverter includes:
    deactivating a first phase circuit of the three-phase power inverter; and
    selectively cyclically activating a first switch of a second phase circuit of the three-phase power inverter, a second switch of the second phase circuit of the three-phase power inverter, a third switch of a third phase circuit of the three-phase power inverter, and a fourth switch of the third phase circuit of the three-phase power inverter.

16. The method of claim 15, wherein the electrical energy at the first relatively lower voltage in direct current includes electrical energy at 400 Volts in direct current.

17. The method of claim 15, wherein the electrical energy at the second relatively higher voltage in direct current includes electrical energy at 800 Volts in direct current.

18. The method of claim 15, wherein the first switch, the second switch, the third switch, and the fourth switch are insulated-gate bipolar transistors.

19. The method of claim 15, wherein the first switch, the second switch, the third switch, and the fourth switch are silicon carbide metal-oxide-semiconductor field-effect transistors.

* * * * *